June 23, 1959  A. L. BECKER  2,891,634
LUBRICATING DEVICE
Filed Sept. 3, 1957
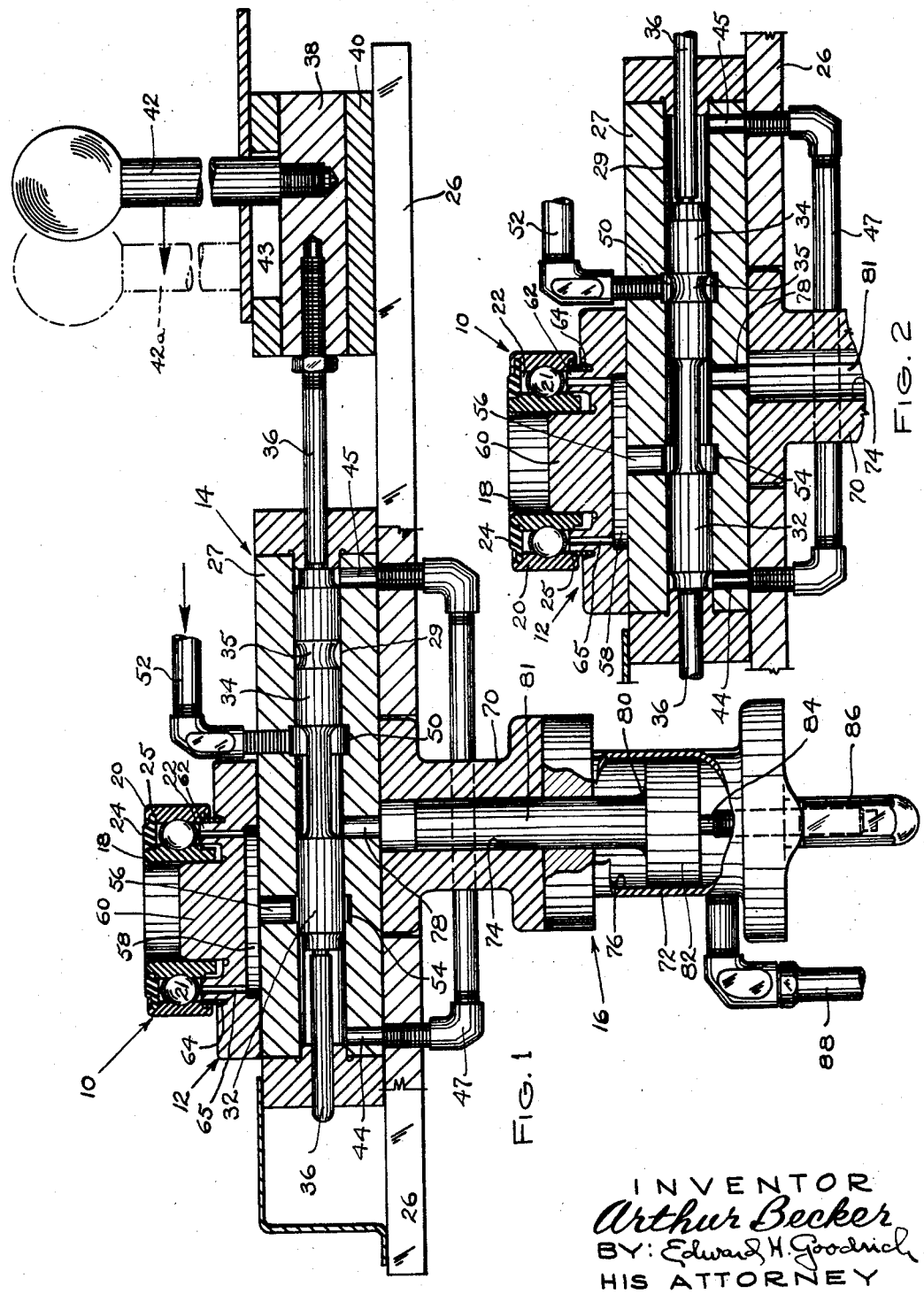
INVENTOR
Arthur Becker
BY: Edward H. Goodrich
HIS ATTORNEY United States Patent Office 2,891,634
Patented June 23, 1959

2,891,634

LUBRICATING DEVICE

Arthur L. Becker, Forestville, Conn., assignor to General Motors Corporation, Detroit, Mich., a corporation of Delaware Application September 3, 1957, Serial No. 681,598

8 Claims. (Cl. 184—1)

This invention relates to lubricating devices and particularly to a lubricating device for injecting a measured amount of grease into an antifriction bearing.

Antifriction bearings and particularly sealed ball bearings which are used at high rotational speeds are very sensitive to the proper volume of a required lubricant. High speed ball bearings of moderate size usually have their lubricant chambers about 25 percent filled with a suitable grease. The volume of this grease in the bearing lubricant chamber is usually quite critical. In some bearing applications when the required amount of grease in each sealed bearing was increased by as little as a fraction of a gram, the bearings overheated and failed after a much shorter than normal life. Also, it is recognized that when the grease within a sealed bearing is appreciably less than the required amount, the grease oxidizes, becomes hard, impedes bearing operation and usually causes much shortened bearing life. Heretofore, the greasing fixtures used in conjunction with production line bearing manufacture have only supplied an approximate volume of grease to each bearing with the result that many bearings have failed long before their normally expected life.

It is, therefore, an object of this invention to provide an improved lubrication device for inserting a predetermined measured amount of lubricant within a bearing.

A further object is to provide a simple and reliable mechanism which sequentially ejects a precisely measured amount of grease into successive bearings.

A still further object of my invention is to provide an improved automatic but adjustable greasing mechanism for antifriction bearings and which successively charges each bearing with precisely the same measured amount of grease.

To these ends and also to improve generally upon devices of this character, my invention resides in the various matters hereinafter described and claimed. In its broader aspects, the invention is not necessarily limited to the specific structure selected for illustrative purposes in the accompanying drawing wherein;

Figure 1 is a fragmentary sectional view showing the lubricating device at the start of a greasing operation; and Figure 2 is a fragmentary sectional view showing the lubricating device at the completion of a greasing operation.

Generally considered, antifriction bearings as a ball bearing 10, are successively placed on a supporting fixture 12 secured to the top of a reversing valve 14 connected to an adjustable metering pump 16 which is supplied with a lubricant as a suitable grease. Each time the reversing valve is operated, the metering pump feeds precisely the same amount of grease into the bearing located on the greasing fixture 12.

The antifriction bearing 10 to be lubricated has the usual coaxial inner and outer race rings 18 and 20 in relatively rotatable relation through a series of rolling elements 21 guided by a separator or cage in an annular lubricant chamber 22 between the race rings. The upper end of the lubricant chamber is closed by a suitable sealing washer 24 herein shown as peripherally held within an annular seal-receiving groove 25 in the outer race ring and extending into wipingly sealing engagement with a cylindrical land on the inner race ring. After the bearing has been charged with the predetermined measured amount of grease and removed from the fixture 12, the open end of the bearing may be closed with a similar sealing washer.

The reversing valve 14, which is mounted on a horizontal support, as a table 26, has a cylinder 27 provided with a longitudinal bore 29 in which are slidably mounted spaced pistons 32 and 34 secured to a piston rod 36 which slidably extends through heads closing the ends of the cylinder. The right hand end of the piston rod is adjustably fastened to a slide member 38 longitudinally slidable in a bracket 40 fastened to the table 26. A control lever 42 secured to the slide member 38 and projecting upwardly through a bracket slot 43 may be manually operated to shift the piston rod and pistons between a grease receiving position shown in Figure 1 and a bearing lubricating position illustrated in Figure 2. When the control lever 42 is shifted to its rearward position as indicated in full lines, the right hand end of the piston 34 locates against the right hand cylinder head as shown in Figure 1. When the lever 42 is shifted to its extreme left position 42a, the pistons are in the positions of Figure 2 with the left end of the piston 32 abutting the left cylinder head. The outer ends of the pistons 32 and 34 are reduced in diameter and ports 44 and 45 entering the cylinder ends adjacent the cylinder heads communicate with each other through piping 47 to prevent trapping of fluid or air in the cylinder ends which might impede shifting of the reversing valve pistons.

An annular recess 50 formed in the cylinder bore 29 is located between the pistons and adjacent the left end of the piston 34 when the pistons are in the position of Figure 1. Piping 52 directs a suitable lubricant, as grease, into this recess 50 under constant pressure. When the pistons are shifted to the illustrated positions of Figure 2, an intermediate grooved portion 35 of the piston 34 locates across the recess 50 and the piston 34 shuts off the feed of lubricant from the piping 52 into the cylinder chamber between the pistons 32 and 34. An annular recess 54 formed in the cylinder 29 is located between the pistons and adjacent the right-hand end of the piston 32 when the pistons are shifted to the position of Figure 2. A port 56 through the cylinder communicates at its lower end with the recess 54 and at its upper end with a chamber 58 formed in the base of the supporting fixture 12. The bearing to be lubricated slidably fits over a cylindrical pilot portion 60 projecting upwardly from the base of the support 12 and an annular projection 62 extending upwardly from this base in radially spaced relation to the pilot 60 has cylindrical inner and outer walls which closely fit within the ends of the annular race ring walls of the annular lubricant chamber 22 during lubrication of each bearing 10. A shield ring 64 demountably fitted over the projection 62 closes off the seal-receiving groove 25 in the outer race ring 20 to prevent grease from entering this groove during a lubricating operation. A series of circumferentially spaced holes 65 extend upwardly from the chamber 58 through the annular projection 62 to deliver lubricant into the lubricant chamber of the bearing 10.

A metering pump cylinder 70 has a head received within a table opening and sealingly seated against the flat underside of the reversing valve cylinder 27. An operating cylinder 72 is sealingly secured at its upper end to the lower end of the pump cylinder 70. These cylinders have coaxial interconnecting vertically disposed cylindrical bores 74 and 76, the bore 74 through the pump cylinder 70 terminating against the flat bottom face of the reversing valve cylinder 27. A port 78 having a diameter smaller than the cylinder bore 74 opens at its lower end generally centrally into this bore and opens at its upper end into the reversing valve cylinder between the pistons 32 and 34, this port being located adjacent the right end of the piston 32 when the parts are in the position of Figure 1 and being located adjacent the left end of the piston 34 when the valve parts are in the position of Figure 2.

A free piston 80 has a smaller cylindrical portion 81 vertically slidable in the bore 74 and a large diameter portion 82 slidable in the lower bore 76. The upward piston movement is limited by engagement of the head of piston portion 81 against the underside of the reversing valve cylinder 27 and the downward piston movement is limited by an adjustable stop screw 84 threaded through the bottom head of the cylinder 72 and locked in position by a nut 86. If desired, the members 81 and 82 may comprise two separate pistons in endwise abutting relation. The stop screw 84 is carefully adjusted so that with the pistons in their bottom positions as illustrated, the volume of grease fed into the top of the metering cylinder 70 between the head of the piston 81 and the bottom wall of the cylinder 27 will correspond exactly to the volume of grease to be delivered into the bearing during a subsequent greasing operation. Air under pressure is fed through piping 88 into the bottom of the cylinder beneath the piston 82 to raise the free piston and feed lubricant to the bearing. However, this air pressure through the piping 88 and against the bottom of the piston member 82 is so regulated that it is overcome by the grease pressure against the top of piston portion 81 when the reversing valve is shifted to the position of Figure 1.

In operation, the lever 42 is shifted to its full line position causing the pistons 32 and 34 to locate as shown in Figure 1. A bearing to be lubricated is seated on the supporting fixture 12 over the pilot 60 with the annular projection 62 closely fitting within the lower outer end of the bearing lubricant chamber 22. Immediately upon shifting the pistons to the position of Figure 1, the grease under constant pressure in the piping 52 enters the chamber between the pistons 32 and 34 and flows through the port 78 causing the free piston 82 to move downwardly to its lower position against the stop screw 84 as indicated in Figure 1. At this time the chamber between the pistons 32 and 34, the port 78 and the metering chamber between the top of the piston portion 81 and the valve cylinder 27 are completely filled with grease. The lever 42 is thereafter shifted to its position 42a shifting the pistons 32 and 34 to the positions of Figure 2. The piston 34 now shuts off the feed from the grease pressure line 52 to the cylinder 27 and the air pressure against the bottom of the free piston 80 rapidly shifts this piston upwardly to its top position against the bottom wall of the cylinder 27 causing a rapid flow of grease upwardly through the port 78 and through the port 56, chamber 58 and holes 65 into the annular lubricant chamber 22 of the bearing 10. With this arrangement, the chamber between the pistons 32 and 34, ports 78 and 56, chamber 58 and holes 65 always remain completely filled with grease and each time that the metering pump 16 ejects the predetermined amount of grease into the reversing valve, a precisely corresponding amount of grease is forced into the bearing lubricant chamber. This mechanism in test has been consistently accurate within less than one tenth of a gram of grease. The lubricated bearing is removed and the cycle is repeated with the next bearing. Usually the open end of the bearing is closed with a suitable seal after the bearing has been lubricated.

I claim:

1. In a lubricating device for an antifriction bearing, a reversing valve, a bearing support on the reversing valve having a passage for delivering lubricant from the valve to the bearing, a metering pump connected to the valve, mechanism to shift the valve between a lubricant-receiving and a lubricant-discharging position, means feeding lubricant under pressure to said valve and through the valve to the metering pump when the valve is in a lubricant-feed receiving position, said valve cutting off the lubricant feed and connecting the metering pump through the valve to the bearing support passage when the valve is in a lubricant-discharging position, and means independent of said lubricant feeding means to operate the metering pump to inject a predetermined amount of lubricant into the bearing while the reversing valve is in its lubricant-discharging position.

2. In a lubricating device, a reversing valve having an inlet port for receiving lubricant and an outlet port for delivering lubricant, a pair of spaced movable valve members having a lubricant chamber therebetween, said valve members having a lubricant receiving position and a lubricant discharging position, a metering pump connected to said chamber for receiving and ejecting a measured amount of lubricant, means independt of said reversing valve and supplying a resilient pressure to operate the metering pump and eject the lubricant therefrom, valve operating mechanism to selectively open each of said ports while holding the other port closed, means supplying lubricant under predetermined pressure into the valve chamber when the valve is in a lubricant-receiving position, said pressure being sufficient to overcome the operative pressure to the metering pump and fill the metering pump with a measured amount of lubricant, and said metering pump automatically operating to deliver a measured amount of lubricant through said chamber and through the outlet port when the valve is shifted to a lubricant discharging position.

3. In a lubricating device, a reversing valve having a pair of spaced pistons with a chamber therebetween and shiftable between a lubricant receiving and a lubricant discharge position, said valve having an inlet port connected to said chamber only when the valve is in its lubricant receiving position and having a discharge port connected to said chamber only when the valve is in its discharge position, a metering pump having a cylinder connected to said valve chamber, a free piston movable in said cylinder, an adjustment member for regulating the extent of free piston movement whereby the cylinder may receive a measured amount of lubricant from the reversing valve, means supplying lubricant through the inlet port into the valve chamber under a predetermined pressure when the valve is in a lubricant receiving position, means supplying a yieldable pressure to move the free piston and eject lubricant from the metering pump when the reversing valve is in its discharge position, and said lubricant feeding pressure into the valve being sufficient to overcome the operating pressure against the free piston.

4. In a lubricating device for an antifriction bearing, a reversing valve, mechanism to selectively shift the valve to a lubricant-receiving and to a lubricant discharging position, a bearing support on the valve having a passage which delivers lubricant from the valve to the bearing when the valve is in its discharging position, a metering pump having a lubricant-receiving chamber of adjustable predetermined size connected to said valve, means to feed lubricant under pressure into and through the valve to fill the pump chamber when the valve is in its lubricant-receiving position, movable valve members which cut off the lubricant pressure feed to the valve and connect the metering pump chamber to the passage in said bearing support when the valve is in its discharge position, and metering pump operating means to discharge lubricant from said metering pump chamber.

5. In a lubricating device for an antifriction bearing, a reversing valve, mechanism to selectively shift the valve to lubricant-receiving and lubricant-discharging positions, a bearing support on the valve having a passage which delivers lubricant from the valve to the bearing when the valve is in its discharging position, a metering pump having a lubricant-receiving chamber of adjustable predetermined size connected to said valve, means to feed lubricant under pressure into and through the valve to fill the pump chamber when the valve is in its lubricant-receiving position, valve mechanism which cuts off the lubricant pressure feed to the valve and connects the metering pump through the valve to the passage in the bearing support when the valve is in its discharging position, and means providing a resilient pressure to eject lubricant from the metering pump into the valve, said pump operating pressure being overbalanced while the valve is under pressure from said lubricant-feeding means.

6. In a lubricating device for an antifriction bearing, a reversing valve, mechanism to shift the valve between lubricant-receiving and lubricant-discharging positions, a bearing support having a passage which delivers lubricant from the valve to the bearing when the valve is in a discharging position, a metering pump connected to the valve and having a free piston movable in a cylinder, means feeding lubricant under constant pressure into said valve and through the valve to fill the pump with a predetermined volume of lubricant while the valve is in its lubricant-receiving position, opposing pressure means against the piston to force lubricant from the metering pump into the reversing valve, and said reversing valve cutting off the constant pressure lubricant feed and connecting the feed from the metering pump through the valve to the passage through the bearing support when the valve is shifted to its discharge position.

7. In a lubricating device for an antifriction bearing, a reversing valve, mechanism to selectively shift the valve to a lubricant-receiving position and to a lubricant-discharging position, a bearing support on the valve and having a passage for delivering lubricant from the valve to the bearing, means directing lubricant under constant pressure to the valve, a metering pump having a cylinder connected to the valve, a free piston movable in the cylinder towards and from the valve, an adjustable member limiting the extent of piston movement to determine the volume of lubricant received in the cylinder, said reversing valve selectively connecting the lubricant pressure means to said pump cylinder when the valve is in its lubricant-receiving position and selectively connecting the pump cylinder to said passage when the valve is shifted to its discharge position, and means independent of said lubricant directing means to operate the pump to eject a measured amount of lubricant from the cylinder into said valve.

8. In a lubricating device for an antifriction bearing, a reversing valve, mechanism to selectively shift the valve to a lubricant-receiving and to a lubricant-discharging position, a bearing support on the valve and having a passage for delivering lubricant from the valve to the bearing, means directing lubricant under constant pressure to the valve, a metering pump having a cylinder connected to the valve, a free piston movable in the cylinder towards and from the valve, adjustable means limiting the extent of piston movement away from the valve, said reversing valve selectively connecting the lubricant pressure means to the pump cylinder when the valve is in its lubricant-receiving position and selectively connecting the pump cylinder to said passage when the valve is in its discharging position, and mechanism providing a yieldable operating force on said piston which is overcome by the lubricant pressure while the valve is in its lubricant-receiving position.

References Cited in the file of this patent

UNITED STATES PATENTS

| | | |
|---|---|---|
| 1,764,823 | Bowlus | June 17, 1930 |
| 2,626,014 | Schmid | Jan. 20, 1953 |
| 2,707,528 | Mulvanity et al. | May 3, 1955 |